United States Patent [19]
Ito et al.

[11] Patent Number: 5,602,682
[45] Date of Patent: Feb. 11, 1997

[54] ABERRATION CORRECTING PLATE FOR INTERCHANGEABLE LENS

[75] Inventors: Takayuki Ito; Takayasu Shishido; Hideto Machii, all of Tokyo, Japan

[73] Assignees: Asahi Kogaku Kogyo Kabushiki Kaisha; Asahi Seimitsu Kabushiki Kaisha, both of Tokyo, Japan

[21] Appl. No.: 280,549

[22] Filed: Jul. 26, 1994

[30] Foreign Application Priority Data

Jul. 27, 1993 [JP] Japan ................................. 5-184601

[51] Int. Cl.⁶ .................................................. G02B 3/00
[52] U.S. Cl. ................................. 359/737; 359/672
[58] Field of Search ...................... 359/737, 672

[56] References Cited

U.S. PATENT DOCUMENTS

| | | | |
|---|---|---|---|
| 3,391,968 | 7/1968 | Betensky | 359/737 |
| 3,454,326 | 7/1969 | Schlegel | 359/737 |
| 3,601,472 | 8/1971 | Gilkeson | 359/737 |
| 3,944,338 | 3/1976 | Fleischman | 359/737 |
| 4,927,250 | 5/1990 | Suda | 359/557 |
| 4,976,526 | 12/1990 | Oshima et al. | 359/737 |
| 5,221,995 | 6/1993 | Yaneyama | 359/688 |
| 5,264,965 | 11/1993 | Hirakawa | 359/686 |
| 5,280,390 | 1/1994 | Ito | 359/676 |

*Primary Examiner*—Georgia Y. Epps
*Assistant Examiner*—Jordan M. Schwartz
*Attorney, Agent, or Firm*—Greenblum & Bernstein, P.L.C.

[57] ABSTRACT

An aberration correcting plate for a compatible interchangeable lens which can be detachably attached to a first camera body having a large resultant thickness of filters provided in front of an image pickup device and to a second camera body having a small resultant thickness of filters provided in front of an image pickup device is mounted to a rear end of the compatible interchangeable lens when the rear end is mounted to the second camera body. The aberration correcting plate is made of a parallel-plate whose refractive index N is greater than 1.7 or a lens of negative power. The sum of the thicknesses of the aberration correcting plate and the filters provided in front of the image pickup device of the second camera body is substantially identical to or smaller than the total thickness of the filters provided in front of the image pickup device of the first camera body.

12 Claims, 12 Drawing Sheets

| Spherical Aberration | Spherical Aberration | Transverse Chromatic Aberration | Astigmatism | Distortion |

Sine Condition    Chromatic Aberration

ABERRATION CORRECTING PLATE FOR INTERCHANGEABLE LENS

BACKGROUND OF THE INVENTION

1. Field of the Invention

The present invention relates to an aberration correcting plate which is mounted to a compatible interchangeable lens for color/monochrome images, used for cameras having different resultant thicknesses of filters (including a glass cover). These filters are provided in front of image pickup devices, and particularly TV cameras, such as CCTV cameras.

2. Description of Related Art

There are two kinds for a camera bodies of CCTV or video camera, etc., for color images and monochrome images. The camera bodies have different kinds of light receiving elements, and different refractive indexes or thicknesses of filters provided in front of the respective light receiving elements, for color images and monochrome images. In a monochrome camera body, a glass cover of the light receiving element whose thickness is approximately 0.8 mm is used as a filter. In a color camera body, there is a low-pass filter in addition to the glass cover. The low-pass filter is usually made of a laminated crystal birefringent plate and an infrared filter and has a thickness of about 5 mm. The refractive index of the filters is approximately 1.5.

The filters are provided on the camera body side, and accordingly, there is inevitably a difference of around 5 mm in total thickness between the filters incorporated in the monochrome camera body and the color camera body.

Consequently, if the interchangeable lens whose aberration has been corrected for color images is mounted to the monochrome camera body, the aberrations, particularly the spherical aberration are considerable, particularly in a lens whose aperture is larger than F1.0, due to the absence of the filter of about 5 mm thickness. To prevent this, it is known to use a medium thickness filter to correct the aberration, to thereby balance the aberration therebetween in a lens having a relatively small aperture. On the other hand, in a lens having an aperture larger than F1.0, a parallel-plate corresponding to the filter for the color camera body is provided at a rear end of the compatible interchangeable lens to correct the aberration.

However, if such a parallel-plate is mounted to the rear end of the compatible interchangeable lens, the parallel-plate interferes with the camera body, depending on the back-focal distance of the lens system or the position of the glass cover on the camera body side, etc., so that it is impossible to mount the compatible interchangeable lens which has been adjusted to meet the color image to the monochrome camera body. If the thickness of the parallel-plate is reduced to prevent the interference, aberration cannot properly be corrected, thus resulting in a deterioration of the image quality.

SUMMARY OF THE INVENTION

The primary object of the present invention is to provide an aberration correcting plate which can be mounted to a rear end of a compatible interchangeable lens for color/monochrome images, used for cameras having different resultant thicknesses of filters (including a glass cover) provided in front of image pickup devices. Particularly a compatible interchangeable lens designed for color images, when the compatible interchangeable lens is mounted to a monochrome camera body, without an occurrence of the parallel-plate with the monochrome camera body.

To achieve the object mentioned above, according to an aspect of the present invention, there is provided an aberration correcting plate for a compatible interchangeable lens which can be detachably attached to a first camera body having a large resultant thickness of filters provided in front of an image pickup device of the first camera body and a second camera body having a small resultant thickness of filters provided in front of an image pickup device of the second camera body. The aberration correcting plate is mounted to a rear portion of the compatible interchangeable lens when the latter is mounted to the second camera body. The aberration correcting plate is made of a parallel-plate whose refractive index N is greater than 1.7 (1.7<N). The sum of the thicknesses of the aberration correcting plate and the filters provided in front of the image pick up device of the second camera body is substantially identical to the total thickness of the filters provided in front of the image pickup device of the first camera body.

According to another aspect of the present invention, there is provided an aberration correcting plate for a compatible interchangeable lens which can be detachably attached to a first camera body having a large resultant thickness of filters provided in front of an image pickup device of the first camera body and a second camera body having a small resultant thickness of filters provided in front of an image pickup device of the second camera body. The aberration correcting plate is mounted to a rear portion of the compatible interchangeable lens when the latter is mounted to the second camera body. The said aberration correcting plate is made of a lens having a negative power, and the sum of the thicknesses of the aberration correcting plate and the filters provided in front of the second camera body is smaller than the total thickness of the filters provided in front of the image pickup device of the first camera body.

Preferably, the aberration correcting plate is made of a negative lens that satisfies the following relationship;

$$-0.1 < 2Y/f < 0$$

wherein "2Y" designates the size (length of diagonals) of an image plane of the image pickup device, and "f" the focal length of the aberration correcting plate, respectively.

If the lens which comprises the aberration correcting plate is made to have first and second identical concave lens surfaces, the aberration correcting plate can be easily mounted in either direction with respect to the compatible interchangeable lens. Namely, if the lens of the aberration correcting plate is provided with identical concave surfaces opposed to each other, the mounting direction of the aberration correcting plate with respect to the compatible interchangeable lens does not matter.

BRIEF DESCRIPTION OF THE DRAWINGS

The invention will be described below in detail with reference to the accompanying drawings, in which.

DESCRIPTION OF THE PREFERRED EMBODIMENT

Figure 22:
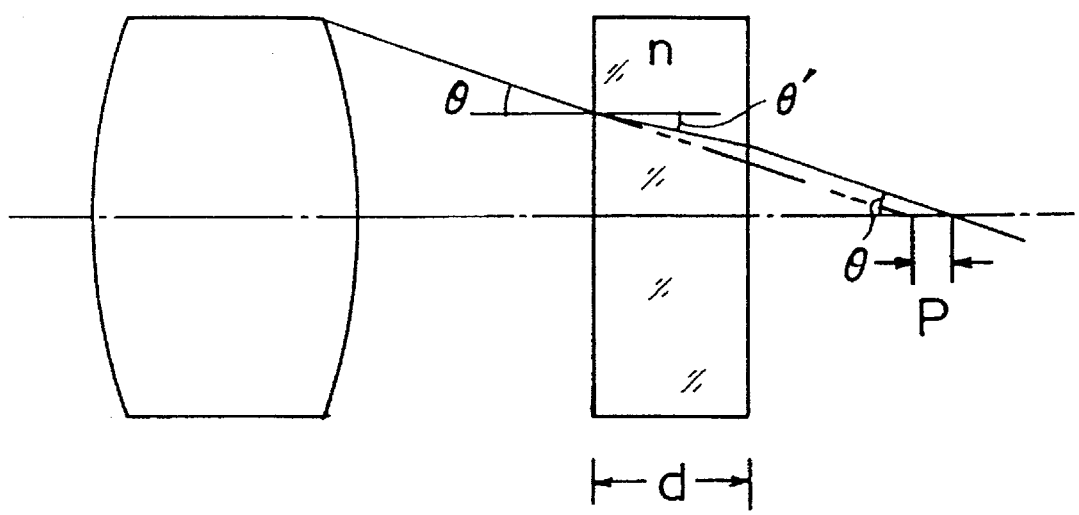

The change of focus caused by a parallel-plate provided between a photographing lens optical system and a surface of an image pickup device is given by the following equation, with reference to FIG. 22.

$$P=[1-(1/n)]d \tag{1}$$

wherein
n: the refractive index of the parallel-plate
d: the thickness of the parallel plate The change in spherical aberration caused by the parallel-plate provided between the photographing lens and the surface of the image pickup device is given by the following equation.

$$SA=[1-(1/n)]d-[1-(\tan\theta')/\tan\theta]d=[(\tan\theta'/\tan\theta)-(1/n)]d \tag{2}$$

wherein $\theta'$ designates the emission angle with respect to the optical axis of the marginal ray within the parallel-plate.

Figure 17:
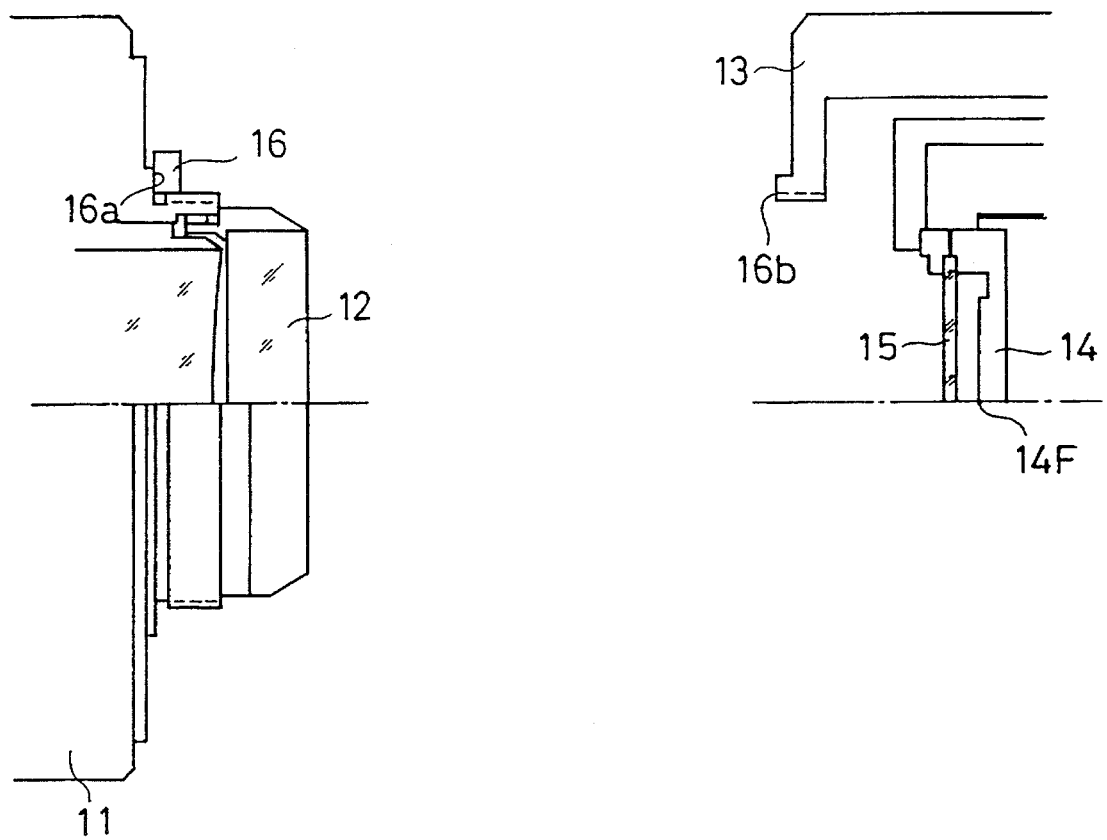
FIG. 17 is a side elevational view of a compatible interchangeable lens, adjusted for color image and provided at the rear end thereof with an aberration correcting plate whose thickness corresponds to that of a low-pass filter for a color camera body before the compatible interchangeable lens is mounted to a monochrome camera body, wherein an upper half thereof is sectioned.
Figure 18:
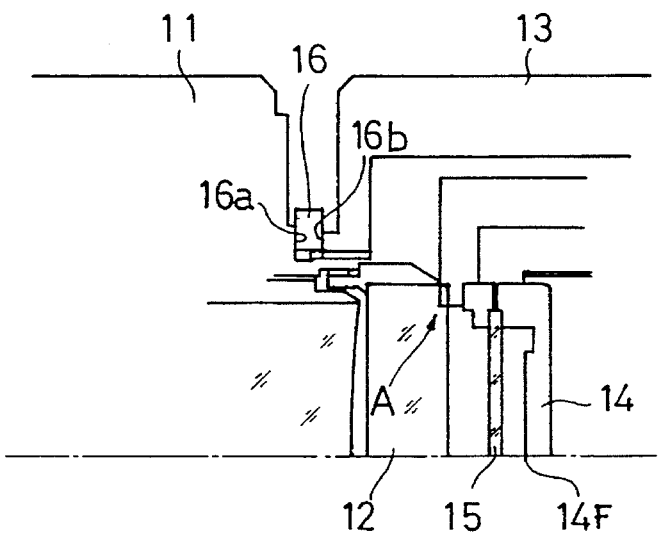
FIG. 18 is a sectional view of an upper half of a compatible interchangeable lens shown in FIG. 17, attached to a monochrome camera body to explain an occurrence of an interference between an aberration correcting plate and the camera body.

With reference to FIG. 22, $n=\sin\theta/\sin\theta'$ $\sin\theta'=1/2F(F=\text{f-number})$ $\theta'=\sin^{-1}[(\sin\theta)/n]=\sin^{-1}(1/2nF)$ It is assumed in the following discussion that the total thickness $d_0$ and the refractive index $n_0$ of the filters located in front of the CCD of the color camera body are 5.2 mm ($d_0=5.2$ mm) and approximately 1.5 ($n_0\approx1.5$), respectively. On this assumption, the aberration correcting parallel-plate 12 whose thickness and refractive index n are 5.2 mm (i.e., reference thickness) and approximately 1.5 ($n\approx1.5$), respectively, is mounted to the rear end of the compatible interchangeable lens 11 adjusted for a color image, and the compatible interchangeable lens 11 is then mounted to the monochrome camera body 13, as shown in FIGS. 17 and 18. The monochrome camera body 13 is provided with a glass cover 15 in front of the monochrome CCD (i.e., image pickup device) 14. The image pickup surface (i.e., focal surface) of the monochrome camera body 13 is indicated at 14F. In this case, as can be seen in FIG. 18, the aberration correcting plate 12 interferes with the monochrome camera body 13 as shown by arrow A, so that it is impossible to mount the compatible interchangeable lens 11 to the monochrome camera body 13. Numeral 16 designates a spacer which is inserted between a flange surface 16a of the compatible interchangeable lens 11 and a flange surface 16b of the monochrome camera body 13 to make the flange back of the monochrome camera body 13 coincident with the flange back of the compatible interchangeable lens 11.

Figure 19:
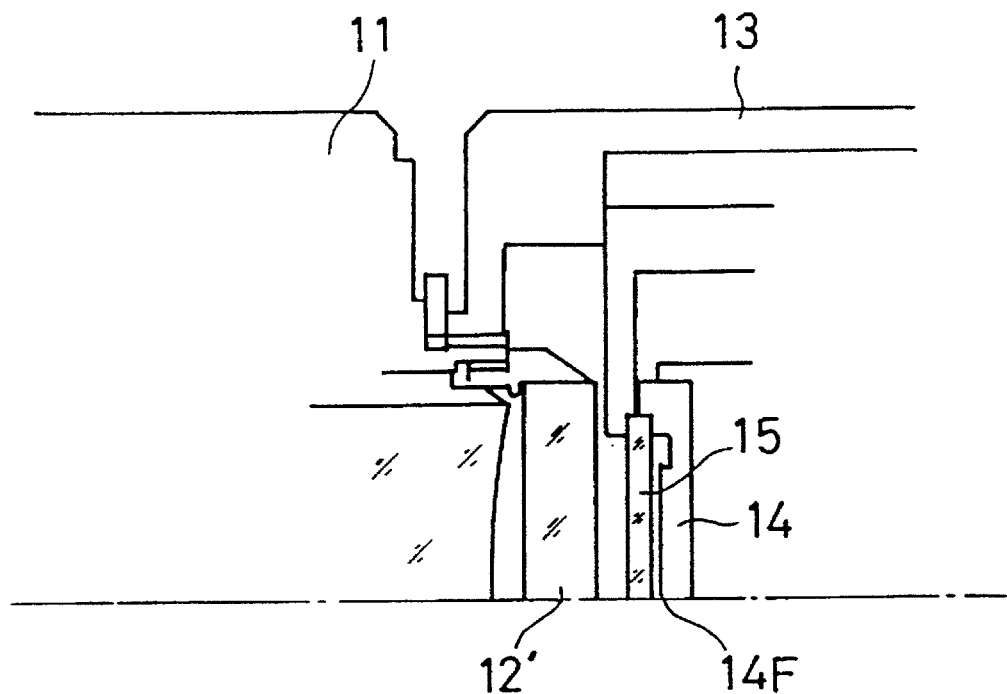
FIG. 19 is a sectional view of an upper half of a thinner aberration correcting plate to prevent the same from interfering with a camera body.
Figure 20:
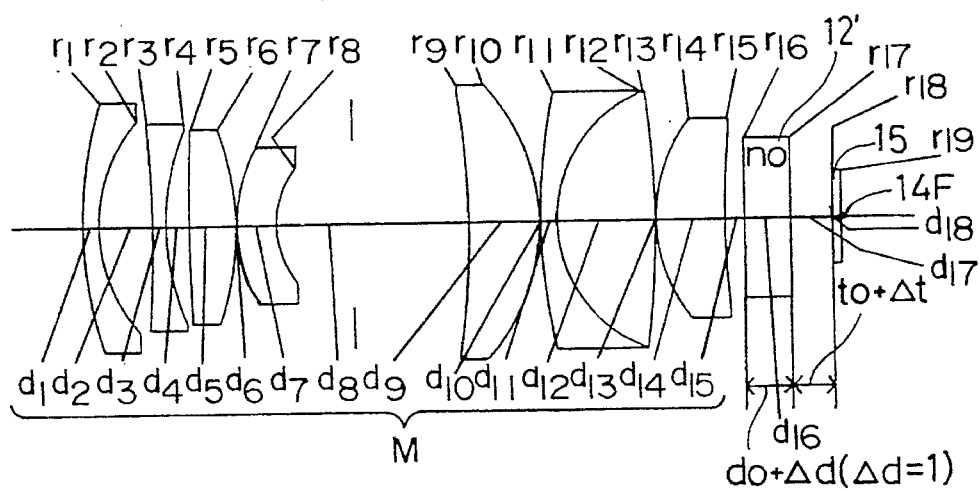
FIG. 20 is a schematic view of an optical system shown in FIG. 19.

FIGS. 19 and 20 show an aberration correcting plate 12' whose thickness d is 4.2 mm (d=4.2 mm) smaller than the thickness (=5.2 mm) of the aberration correcting plate 12 shown in FIGS. 17 and 18 by 1 mm. The thinner aberration correcting plate 12' does not interfere with the monochrome camera body 13, so that the compatible interchangeable lens can be mounted to the monochrome camera body 13. However, the use of such a thin aberration correcting plate 12' invites an occurrence of various aberrations (particularly, spherical aberration), thus resulting in a deteriorated monochrome image.

If the thickness d is constant, from the equation (1) we have;

$$\Delta P=[1-(1/n)]d-[1-(1/n_0)]d=[(1/n_0)-(1/n)]d=\Delta t \tag{3}$$

Consequently, since the focal point P changes in the positive (plus) direction when the value of n increases, the distance t between the aberration correcting plate and the glass cover can be increased.

Moreover, if the thickness d is constant, from the equation (2) we have;

$$\Delta SA = \{[\tan[\theta'(n)]/\tan\theta] - (1/n)\}d - \{[\tan[\theta'(n_0)]/\tan\theta] - (1/n_0)\}d \quad (4)$$

wherein tan θ' is a function of the f-number and the value of "n" (or "$n_0$"), and tan θ is a function of only the f-number.

From this, and in view of $n_0 \approx 1.5$, it can be found that if the glass whose refractive index is greater than 1.7 (1.7<n) is used, the change of the aberration is negligible in comparison with the change in the thickness of the lens.

FIRST EMBODIMENT

Figure 1:
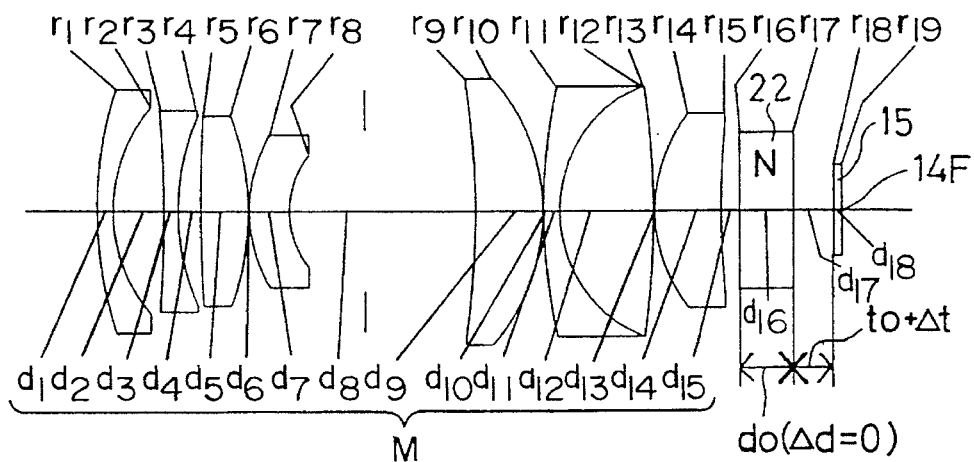
FIG. 1 is a schematic view of an optical system including an aberration correcting plate mounted to a compatible interchangeable lens for color/monochrome images, according to a first embodiment of the present invention.
Figure 2:
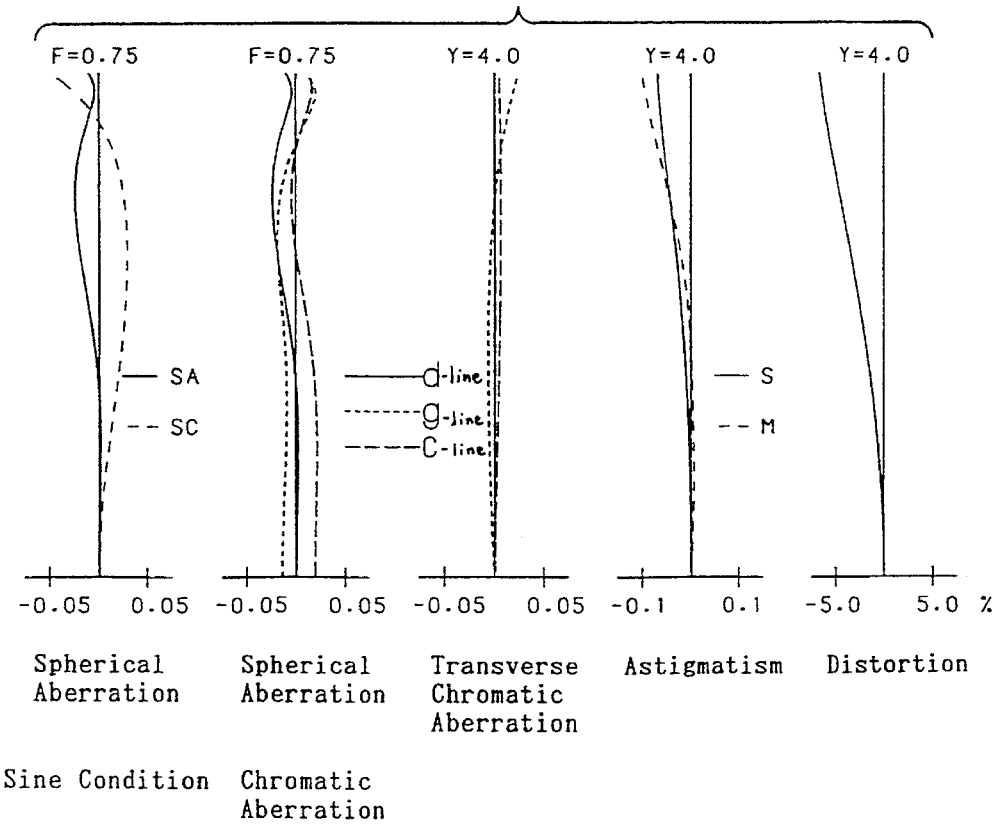
FIG. 2 shows diagrams of various aberrations in an optical system shown in FIG. 1.
Figure 3:
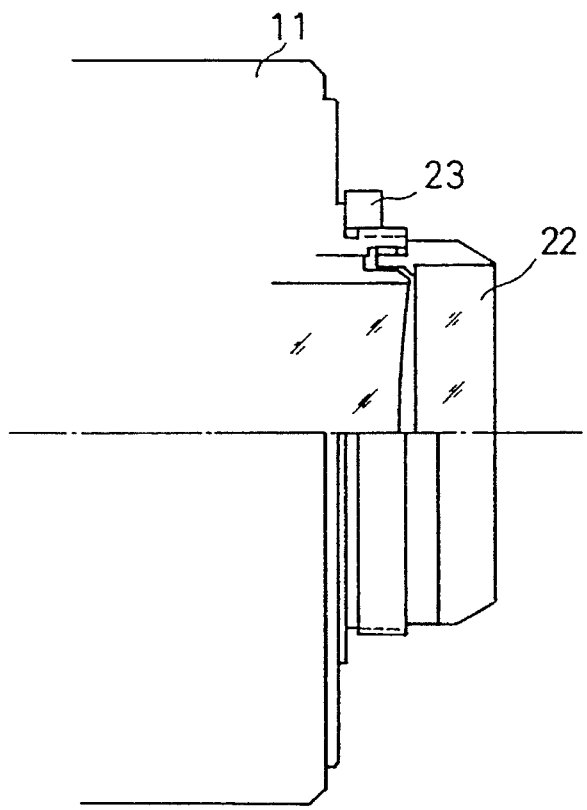
FIG. 3 is a side elevational view of an aberration correcting plate shown in FIG. 1, mounted to a rear end of a compatible interchangeable lens, wherein an upper half thereof is sectioned.
Figure 4:
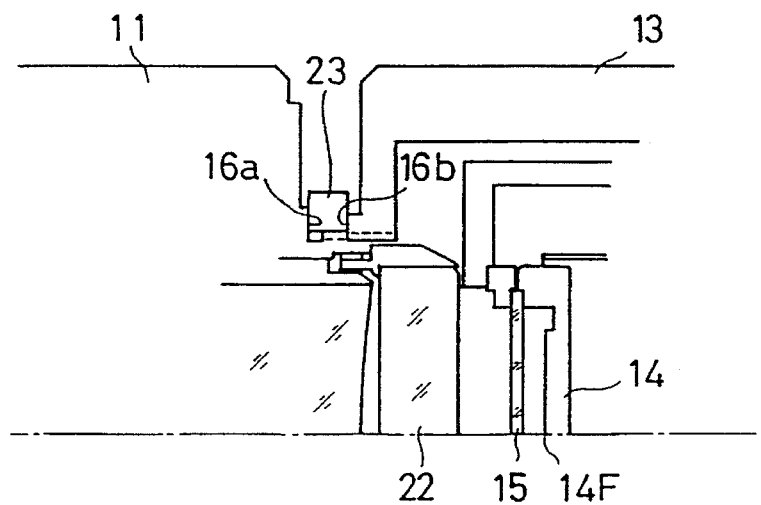
FIG. 4 is a sectional view of an upper half of a compatible interchangeable lens shown in FIG. 3, attached to a monochrome camera body.

FIG. 1 and Table 1 below show a first embodiment of the aberration correcting plate 22 according to the present invention, in connection with an example of the color/monochrome compatible interchangeable lens. FIG. 2 shows various aberrations when the compatible interchangeable lens with the aberration correcting plate shown in FIG. 1 is mounted to the monochrome camera body. FIGS. 3 and 4 show a mechanical arrangement of the compatible interchangeable lens 11 mounted to the monochrome camera body 13.

The thickness of the aberration correcting plate (parallel-plate) 22 whose refractive index N is greater than 1.7 (1.7<N) is substantially identical to that of the filter provided in front of the image pickup device of the color camera body.

When the parallel plate 22 made of high refractive index material, as discussed above is attached to the rear portion of the color/monochrome compatible lens barrel, the flange back is optically extended, so that the thickness of the spacer 23 to be inserted between the flange surface 16a of the compatible interchangeable lens 11 and the flange surface 16b of the monochrome camera body 13 must be increased. Consequently, there is no interference of the aberration correcting plate 22 mounted to the rear portion of the compatible interchangeable lens 11 with the monochrome camera body 13.

In Tables and the drawings, "$r_i$" designates the radius of curvature of each lens surface, "$d_i$" the lens thickness or the distance between the lenses, "N" the refractive index, and "υ" the Abbe number, respectively.

In the aberration diagrams, "SA" designates the spherical aberration and "SC" the sine condition. "d-line", "g-line" and "C-line" designates the spherical aberrations at the respective wavelengths (i.e., chromatic aberration) and the transverse chromatic aberration. "S" designate the distortion in the sagittal direction. "M" designates the distortion in the meridional direction.

TABLE 1

| surface No. | r | d | N | υ |
|---|---|---|---|---|
| 1 | 35.829 | 1.49 | 1.77250 | 49.6 |
| 2 | 14.335 | 4.91 | | |
| 3 | −112.034 | 1.29 | 1.51633 | 64.1 |
| 4 | 21.403 | 2.16 | | |
| 5 | 155.159 | 4.49 | 1.84666 | 23.8 |
| 6 | −24.296 | 0.10 | | |
| 7 | 13.937 | 3.74 | 1.84666 | 23.8 |
| 8 | 8.225 | 17.52 | | |
| stop | ∞ | 10.43 | | |
| 9 | −75.160 | 6.36 | 1.77250 | 49.6 |
| 10 | −18.342 | 0.10 | | |

TABLE 1-continued

| surface No. | r | d | N | υ |
|---|---|---|---|---|
| 11 | 52.875 | 1.49 | 1.84666 | 23.8 |
| 12 | 12.314 | 9.11 | 1.77250 | 49.6 |
| 13 | −78.843 | 0.10 | | |
| 14* | 14.223 | 6.36 | 1.66910 | 55.4 |
| 15 | 76.838 | 1.80 | | |
| 16 | ∞ | 5.20 | 1.83400 | 37.2 |
| 17 | ∞ | 3.78 | | |
| 18 | ∞ | 0.80 | 1.48782 | 66.8 |
| 19 | ∞ | | | |

$F_{NO} = 1:0.7$
$F = 6.20$
$\omega = 34.7$
wherein,
$F_{NO}$ represents f-number,
F represents a focal length; and
ω represents a half angle of view.
*marked surface is aspherical.

No.14;
K=0.0, A4=−0.10940 ×$10^{-4}$, A6=0.12483×$10^{-6}$,
A8=−0.19506×$10^{-8}$, A10=0.97455×$10^{-1}$ $^1$, A12=0.0
Aspherical surface is defined by the following equation;

$$x = cy^2/\{1+[1-(1+K)c^2y^2]^{1/2}\} + A4y^4 + A6y^6 + A8y^8 + A10y^{10}$$

wherein, y represents a height above the axis, x represents a distance from a tangent plane of an aspherical vertex, c represents a curvature of the aspherical vertex (1/ r), K represents a conic constant, A4 represents a fourth-order aspherical aberration factor, A6 represents a sixth-order aspherical aberration factor, A8 represents a eighth-order aspherical aberration factor; and, A10 represents a tenth-order aspherical aberration factor.

Among the above-mentioned lens data, data of the 1st through 15th lens surfaces correspond to those of a master lens M shown in the drawings (e.g., FIG. 1) by way of example. The same is true in the second, third and fourth embodiments of the present invention which will be discussed below. Data of the 16th and 17th surfaces are those of the aberration correcting plate 22 whose thickness and refractive index n are identical to the reference thickness $d_0$ (Δd=0) and 1.83400 (>1.7), respectively, according to the present invention. Data of the 18th and 19th surfaces are those of the glass cover 15 of the monochrome camera body 13. On the assumption that the distance between the conventional aberration correcting plate whose refractive index is 1.5 ($n_0 \approx 1.5$) and the glass cover 15 is "t", and that the distance of the aberration correcting plate from the last lens surface is 1.8 mm, the reference value of the distance "t" is 3.14 mm when $n_0$=1.5. Accordingly, owing to the aberration correcting plate 22, the value of Δ t is increased by 0.64, as follows.

$$\Delta t = 3.78 - 3.14 = 0.64$$

Consequently, there is no interference between the aberration correcting plate 22 and the monochrome camera body 13. The aberrations of the images caused by the compatible interchangeable lens 11 to which the aberration correcting plate 22 is mounted are corrected, as can be seen in FIG. 2.

SECOND EMBODIMENT

Figure 5:
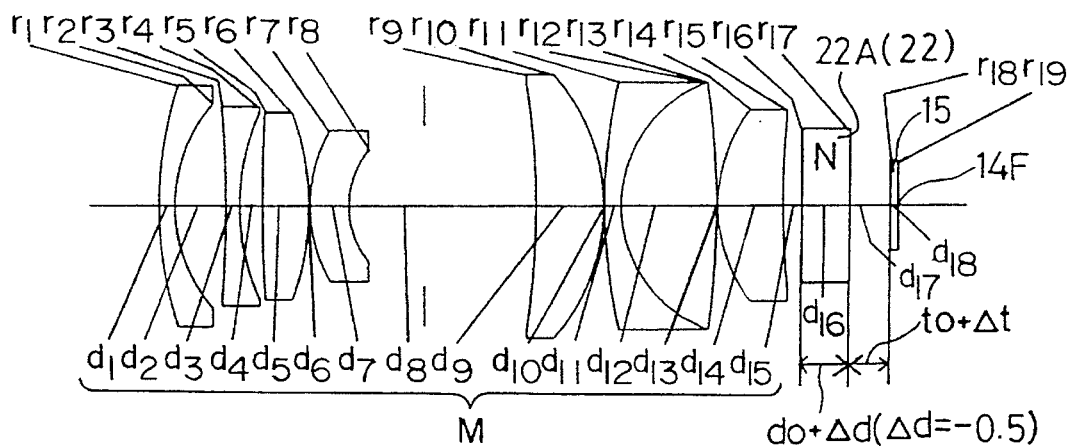
FIG. 5 is a schematic view of an optical system including an aberration correcting plate mounted to a compatible interchangeable lens for color/monochrome images, according to a second embodiment of the present invention.

FIG. 5 and Table 2 below show a second embodiment of the aberration correcting plate 22, in connection with the color/monochrome compatible interchangeable lens by way of example, according to the present invention.

Since the lens structure (surface Nos. 1 through 15) of the master lens M and the glass cover (surface Nos. 18 and 19) of the image pickup device in the second embodiment are the same as those in the first embodiment, data of the 16th and 17th surfaces only is shown in Table 2. The same is true in the third and fourth embodiments and the comparative example, which will be all discussed hereinafter.

Figure 6:
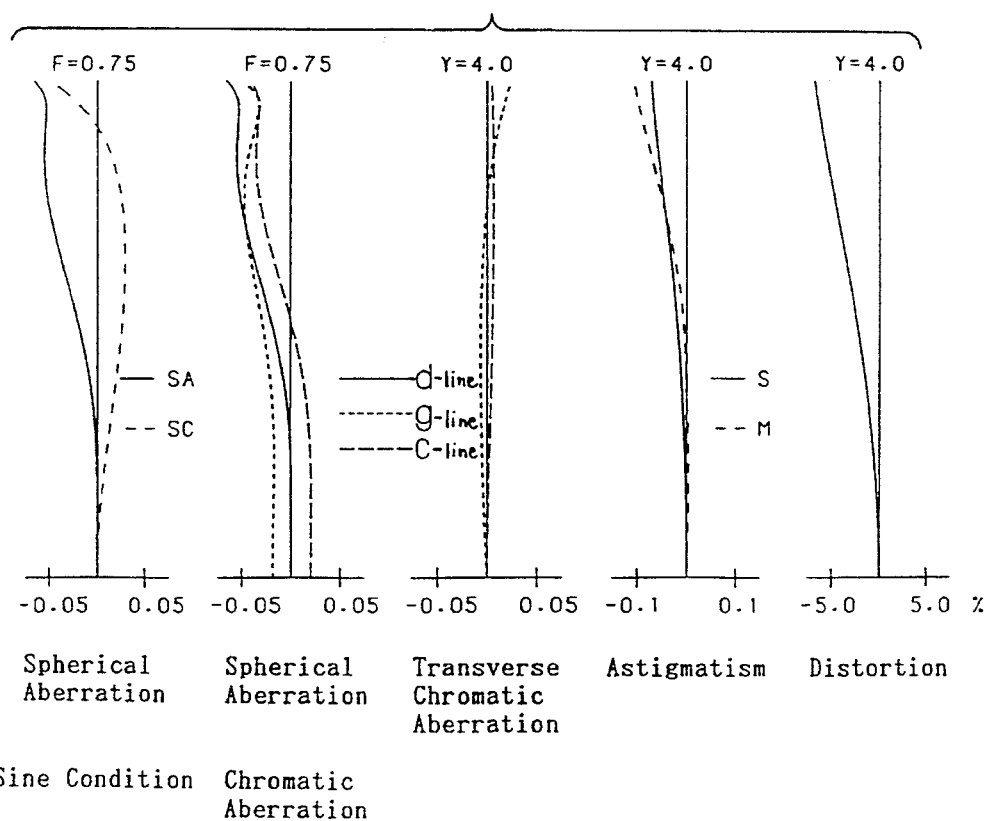
FIG. 6 shows diagrams of various aberrations in an optical system shown in FIG. 5.
Figure 7:
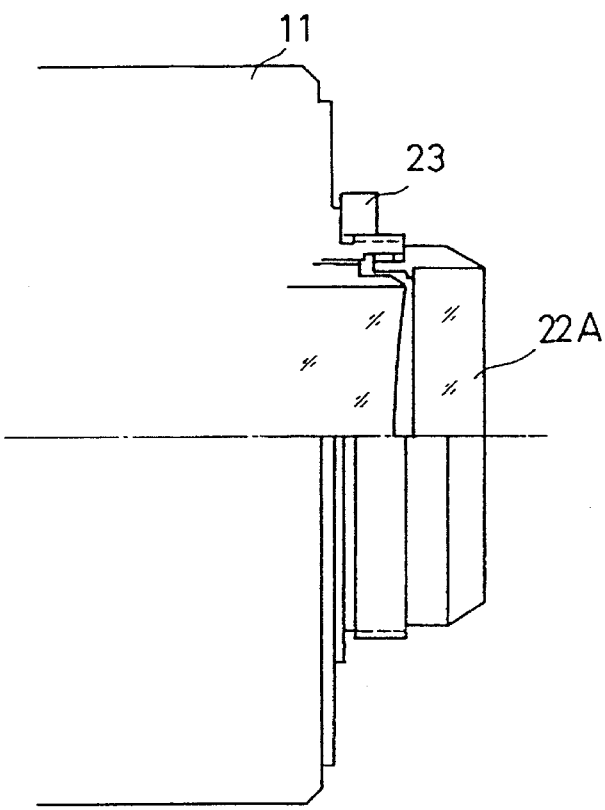
FIG. 7 is a side elevational view of an aberration correcting plate shown in FIG. 5, mounted to a rear end of a compatible interchangeable lens, wherein an upper half thereof is sectioned.
Figure 8:
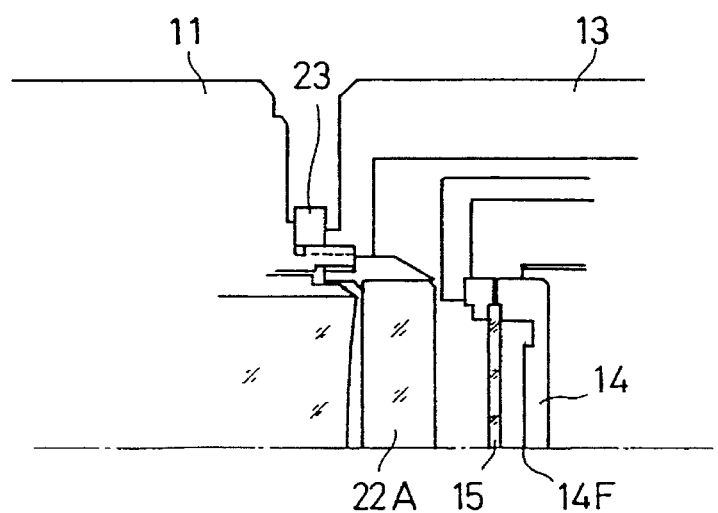
FIG. 8 is a sectional view of an upper half of a compatible interchangeable lens shown in FIG. 7, attached to a monochrome camera body.

FIG. 6 shows various aberrations when the compatible interchangeable lens is mounted to the monochrome camera body, and FIGS. 7 and 8 show a mechanical arrangement of the compatible interchangeable lens 11 to be mounted to the monochrome camera body 13.

The aberration correcting plate 22 is slightly thinner than the filter provided in front of the image pickup device of the color camera body and has a refractive index N greater than 1.7 (N>1.7).

TABLE 2

| surface No. | r | d | N | ν |
| --- | --- | --- | --- | --- |
| 16 | ∞ | 4.70 | 1.83400 | 37.2 |
| 17 | ∞ | 4.05 | | |

The thickness of the aberration correcting plate 22 in the second embodiment is less than the reference value $d_0$ (=5.2 mm) by 0.5 mm (i.e., $\Delta$ d=−0.5), and the refractive index n thereof is 1.83400 (>1.7). On the assumption that the distance between the conventional aberration correcting plate whose refractive index is 1.5 (no≈1.5) and the glass cover 15 is "t", the value of $\Delta$ t is increased by 0.91 ($\Delta$ t=0.91). Consequently, there is no interference between the aberration correcting plate 22 and the monochrome camera body 13. The aberrations of the images caused by the compatible interchangeable lens 11 to which the aberration correcting plate 22 is mounted are corrected, as can be seen in FIG. 6.

THIRD EMBODIMENT

Figure 9:
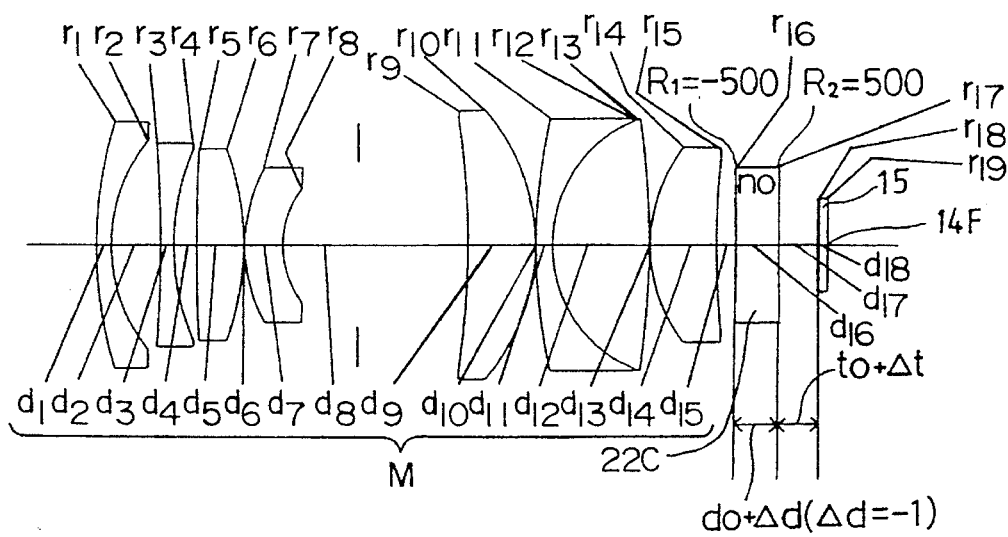
FIG. 9 is a schematic view of an optical system including an aberration correcting plate mounted to a compatible interchangeable lens for color/monochrome images, according to a third embodiment of the present invention.
Figure 10:
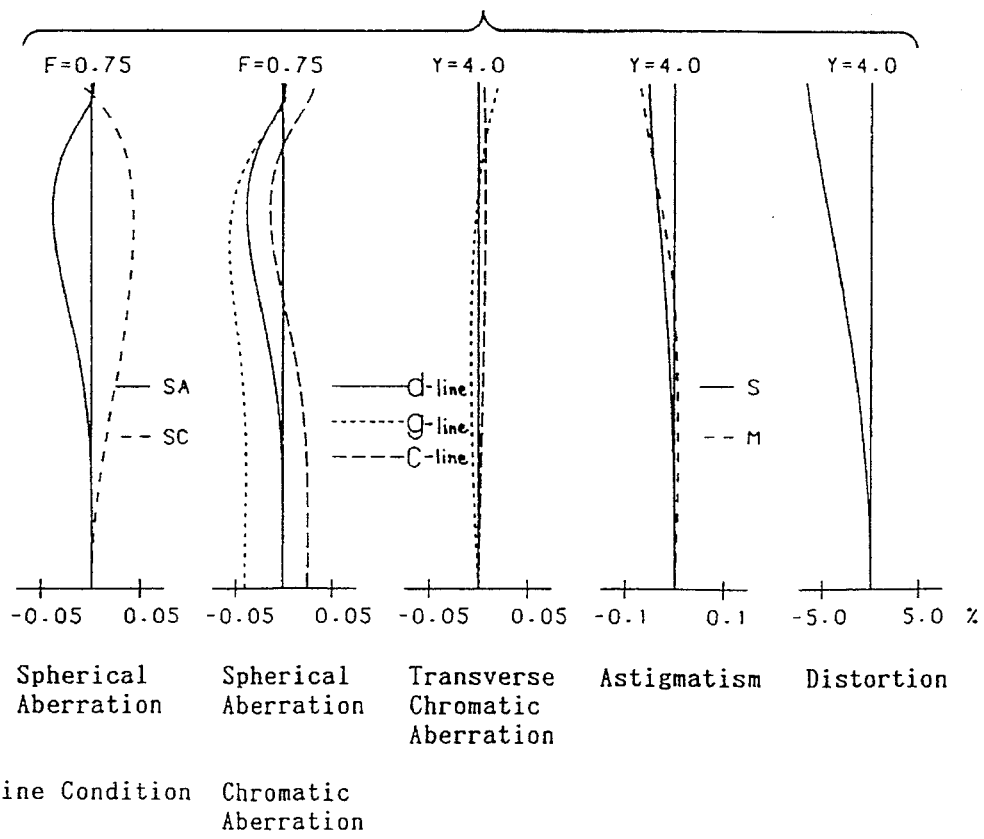
FIG. 10 shows diagrams of various aberrations in an optical system shown in FIG. 9.

FIG. 9 and Table 3 below show a third embodiment of the aberration correcting plate 22C, in connection with the color/monochrome compatible interchangeable lens by way of example, according to the present invention. In the third embodiment, the aberration correcting plate 22C is made of a lens having a small negative power. FIG. 10 shows various aberrations of images caused by the compatible interchangeable lens 11 to which the aberration correcting plate 22C is mounted. Figures corresponding to FIGS. 3 and 4 are omitted.

Figure 21:
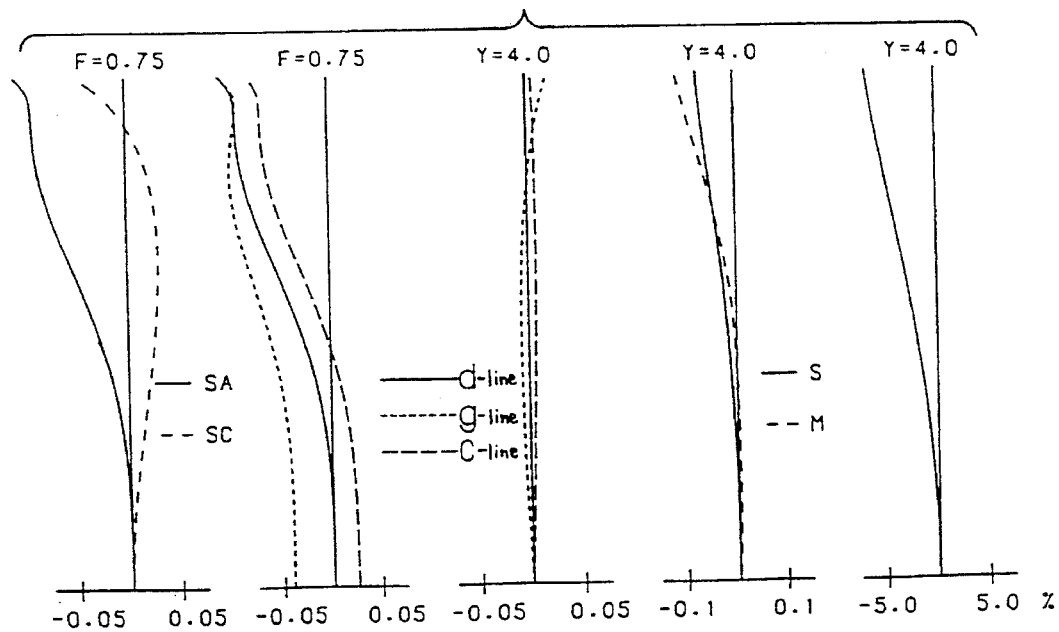
FIG. 21 shows diagrams of various aberrations in an optical system shown in FIG. 20; and, FIG. 22 is an explanatory view of an aberration correcting plate which changes an optical path.

If the thickness of the aberration correcting plate 22 made of a parallel-plate is reduced, the spherical aberration changes in the negative (minus) direction, as described above with reference to FIG. 21. In the third embodiment, not only can the spherical abberation be corrected, but also the distance between the spherical aberration and the image pickup device can be increased by the reduced thickness of the aberration correcting plate thereof. The aberration correcting plate 22C with a small negative power should preferably satisfy the following relationship;

$$-0.1 < 2Y/f < 0$$

wherein "2Y" designates the size of the image plane (i.e., the length of a diagonal line of the image plane) of the image pickup device, and "f" the focal length of the aberration correcting plate, respectively.

If the value of 2Y/f is above the upper limit, the power is positive and accordingly the object of the present invention cannot be achieved. Similarly, if the value is below the lower limit, the spherical aberration is over corrected and accordingly the object of the present invention cannot be achieved. Preferably, the first surface and the second surface of the aberration correcting plate have the same concave surface, so that the aberration correcting plate can be mounted in either direction.

TABLE 3

| surface No. | r | d | N | ν |
| --- | --- | --- | --- | --- |
| 16 | −500.000 | 4.20 | 1.49782 | 66.8 |
| 17 | −500.000 | 3.88 | | |

The thickness of the aberration correcting plate 22C at the center portion thereof is smaller than the reference value $d_0$ by 1.0 mm ($\Delta$ d=−1.0), but the thickness thereof at the peripheral edge is identical to the reference value $d_0$. The focal length f of the aberration correcting plate 22C is −501.5 mm and the value of (2Y/f) is −0.016(2Y/f=−0.016). On the assumption that the distance between the conventional aberration correcting plate whose refractive index is 1.5 (no≈1.5) and the glass cover 15 is "t", the value of $\Delta$t is increased by 0.74 ($\Delta$ t=0.74). Consequently, there is no interference between the aberration correcting plate 22C and the monochrome camera body 13. The aberrations of the images caused by the compatible interchangeable lens 11 to which the aberration correcting plate 22C is mounted are corrected, as can be seen in FIG. 10.

FOURTH EMBODIMENT

Figure 11:
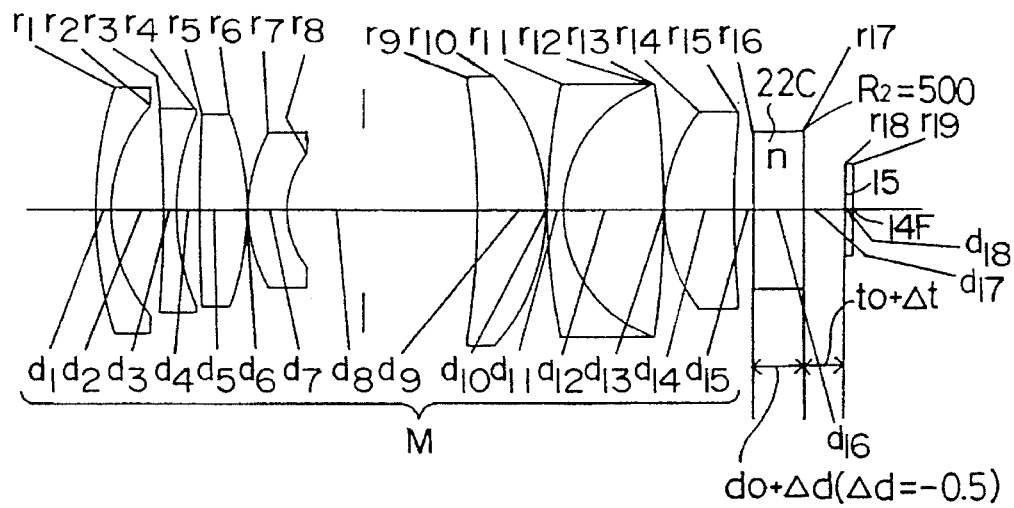
FIG. 11 is a schematic view of an optical system including an aberration correcting plate mounted to a compatible interchangeable lens for color/monochrome images, according to a fourth embodiment of the present invention.
Figure 12:
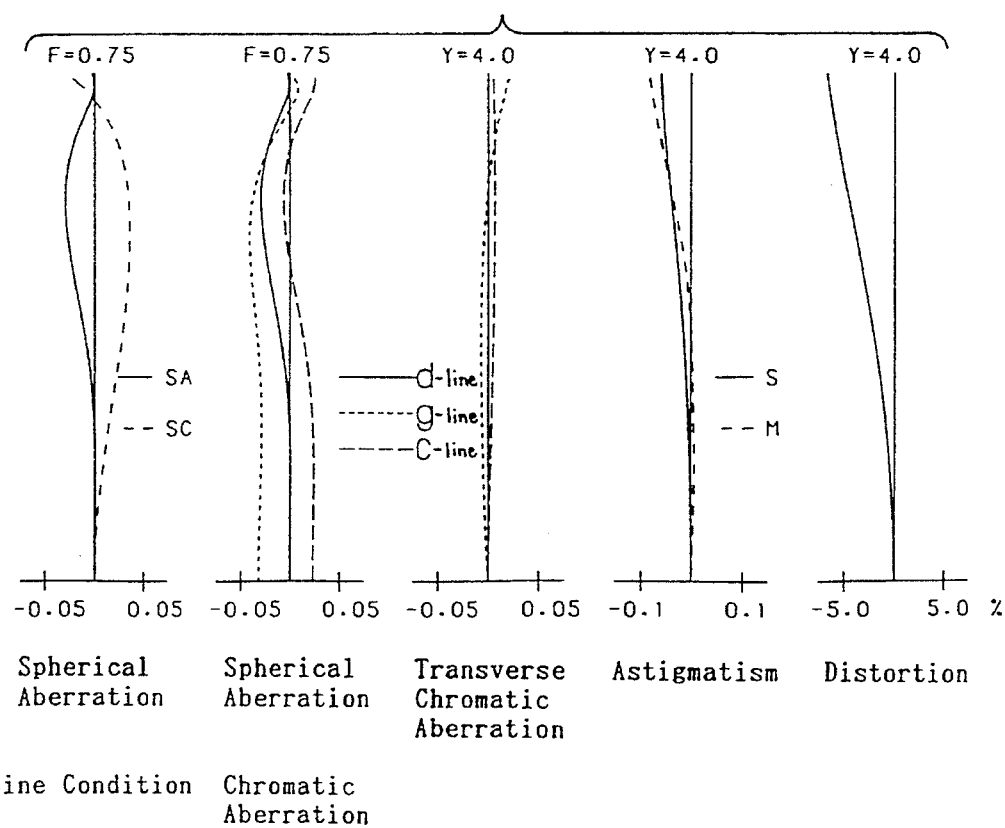
FIG. 12 shows diagrams of various aberrations in an optical system shown in FIG. 11.

FIG. 11 and Table 4 below show a fourth embodiment of the aberration correcting plate 22C, in connection with the color/monochrome compatible interchangeable lens by way of example, according to the present invention. In the fourth embodiment, the aberration correcting plate 22C is made of a lens having a small negative power. FIG. 12 shows various aberrations of images caused by the compatible interchangeable lens 11 to which the aberration correcting plate 22C is mounted. Figures corresponding to FIGS. 3 and 4 are omitted.

TABLE 4

| surface No. | r | d | N | ν |
| --- | --- | --- | --- | --- |
| 16 | ∞ | 4.70 | 1.69680 | 55.5 |
| 17 | 500.000 | 3.87 | | |

The thickness of the aberration correcting plate 22C at the center portion thereof is less than the reference value $d_0$ by 0.5 mm ($\Delta$ d=−0.5). The focal length f is −717.6 mm and the value of (2Y/f) is −0.011 (2Y/f=−0.011). Data of the 18th and 19th surfaces are those of the glass cover 15 of the monochrome camera body 13. On the assumption that the distance between the conventional aberration correcting plate whose refractive index is 1.5 (no≈1.5) and the glass cover 15 is "t", the value of $\Delta$ t is increased by 0.73 ($\Delta$ t=0.73). Consequently, there is no interference between the aberration correcting plate 22C and the monochrome camera body 13. The aberrations of the images caused by the compatible interchangeable lens 11 to which the aberration correcting plate 22C is mounted are corrected, as can be seen in FIG. 12.

COMPARATIVE EXAMPLE

Figure 13:
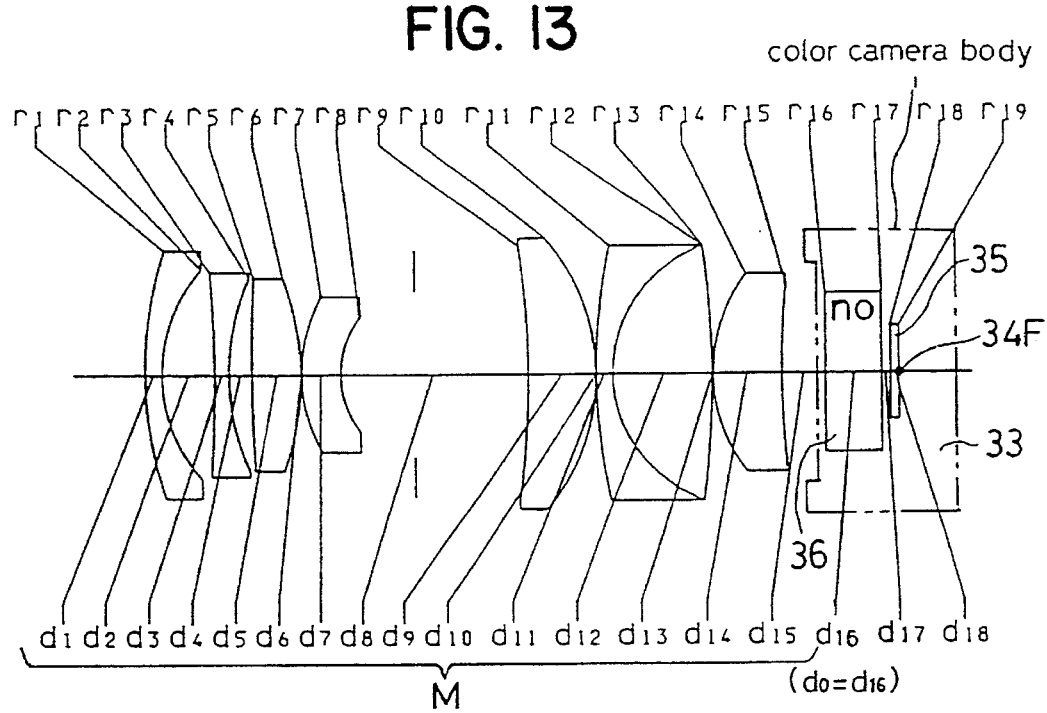
FIG. 13 is a schematic view of an optical system of a compatible interchangeable lens for color/monochrome images, designed for color images, and a color camera body to which the compatible interchangeable lens is mounted.
Figure 14:
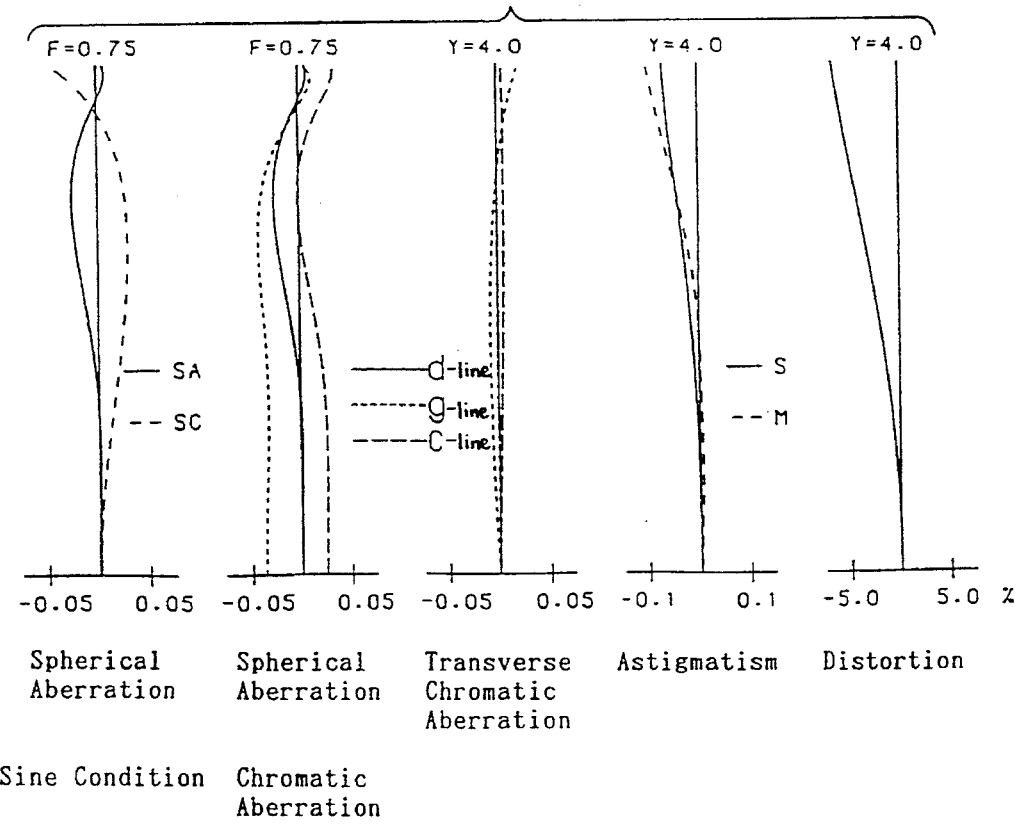
FIG. 14 shows diagrams of various aberrations in an optical system shown in FIG. 13.
Figure 15:
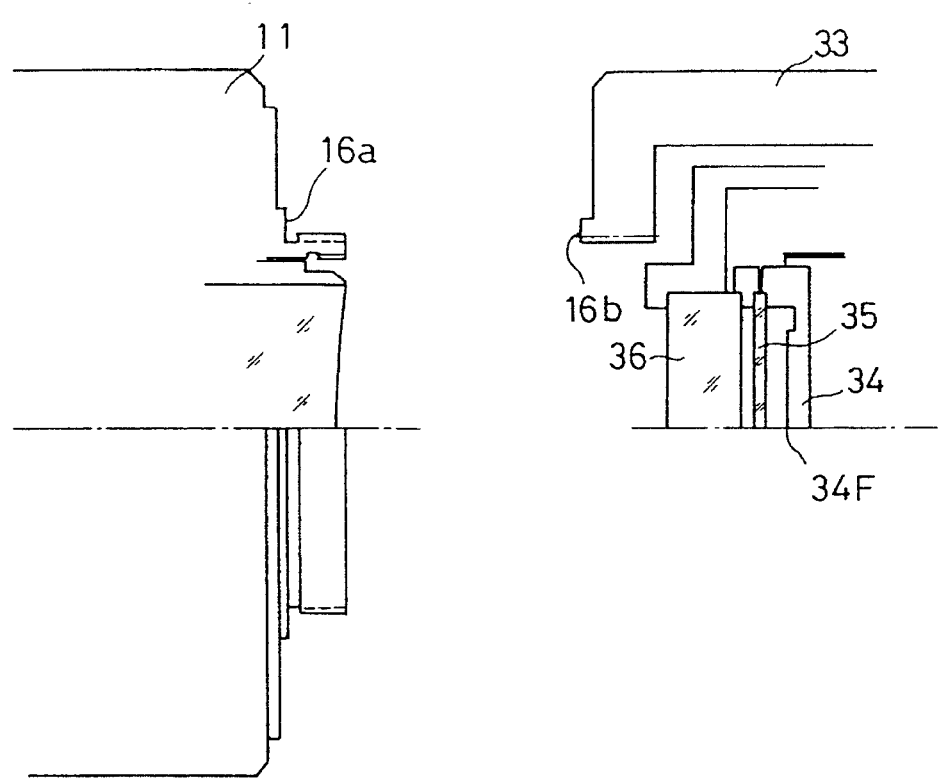
FIG. 15 is a side elevational view of a compatible interchangeable lens before it is mounted to a color camera body, wherein an upper half thereof is sectioned.
Figure 16:
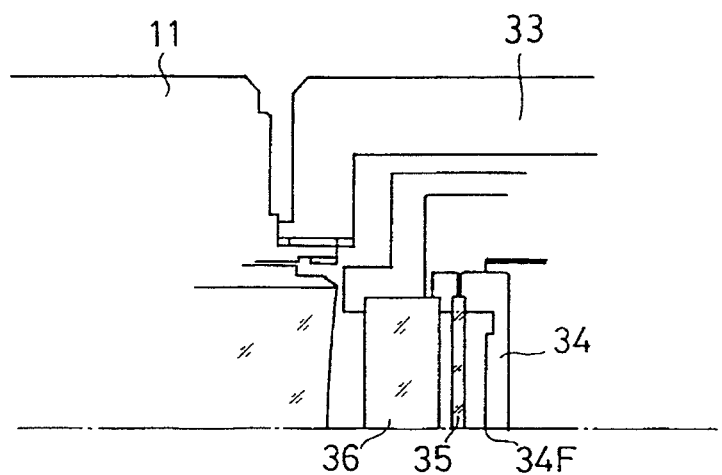
FIG. 16 is a sectional view of an upper half of a compatible interchangeable lens attached to a color camera body.

FIG. 13 and Table 5 below show a lens structure of a compatible interchangeable lens 11 having no aberration correcting plate 22 or 22C, mounted to the color camera body 33. FIG. 14 shows various aberrations of images caused by the compatible interchangeable lens 11 without the aberration correcting plate 22 or 22C. FIGS. 15 and 16 show a mechanical arrangement of the compatible interchangeable lens 11 to be mounted to the color camera body 33. The color camera body 33 is provided with a glass cover 35 and a low-pass filter 36 (including an infrared filter) provided in front of the color CCD 34. Numeral 34F denotes the image pickup surface (focal plane) of the color camera body 33. There is no spacer between the flange surface 16a of the compatible interchangeable lens 11 and the flange surface 16b of the color camera body 33.

TABLE 5

| surface No. | r | d | N | ν |
|---|---|---|---|---|
| 16 | ∞ | 5.20 | 1.49782 | 66.8 |
| 17 | ∞ | 0.80 | | |
| 18 | ∞ | 0.80 | 1.49782 | 66.8 |
| 19 | ∞ | | | |

Data of the 16th and 17th surfaces are those of the lowpass filter 36 of the color camera body 33, and data of the 18th and 19th surfaces are those of the glass cover 35, respectively.

As can be understood from the above discussion, according to the present invention, a high quality monochrome image in which the aberrations are corrected can be obtained by the aberration correcting plate which is mounted to the rear portion of the color/monochrome compatible interchangeable lens designed for color images. Furthermore, when the compatible interchangeable lens is mounted to the monochrome camera body, no interference between the aberration correcting plate and the monochrome camera body occurs.

I claim:

1. An aberration correcting plate for an interchangeable lens detachably attachable to a first camera body having a large resultant thickness of filters provided in front of an image pickup device of the first camera body and to a second camera body having a small resultant thickness of filters provided in front of an image pickup device of the second camera body wherein said aberration correcting plate comprises a single parallel-plate with a uniform refractive index greater than 1.7 and further comprises means for correcting spherical aberration, wherein said aberration correcting plate is mounted to a rear portion of the interchangeable lens when said rear portion is mounted to the second camera body, and wherein the sum of the thicknesses of the aberration correcting plate and the filters provided in front of the image pickup device of the second camera body is substantially identical to the total thickness of the filters provided in front of the image pickup device of the first camera body.

2. The aberration correcting plate of claim 1, wherein said first camera body and second camera body comprise a color camera body and a monochrome camera body, respectively.

3. An aberration correcting plate according to claim 1, wherein an interchangeable lens for a color image forming camera body is mountable to a monochrome image forming camera body.

4. An aberration correcting plate for an interchangeable lens detachably attachable to a first camera body having a large resultant thickness of filters provided in front of an image pickup device of the first camera body and to a second camera body having a small resultant thickness of filters provided in front of an image pickup device of the second camera body, wherein said aberration correcting plate comprises a single lens having a negative power and a uniform index of refraction, and further comprises means for correcting spherical aberration, said aberration correcting plate being mounted to a rear portion of the interchangeable lens when said rear portion is mounted to the second camera body, wherein the sum of the thicknesses of the aberration correcting plate and the filters provided in front of the image pickup device of the second camera body is less than the total thickness of the filters provided in front of the image pickup device of the first camera body.

5. The aberration correcting plate of claim 4, wherein said first camera body and second camera body comprise a color camera body and a monochrome camera body, respectively.

6. An aberration correcting plate according to claim 4, wherein said aberration correcting plate satisfies the following relationship;

$$-0.1 < 2Y/f < 0$$

wherein "2Y" designates the length of diagonals of an image plane of the image pickup device, and "f" designates the focal length of the aberration correcting plate, respectively.

7. An aberration correcting plate according to claim 4, wherein said lens of said aberration correcting plate includes first and second identical concave lens surfaces.

8. An aberration correcting plate according to claim 4, wherein an interchangeable lens for a color image forming camera body is mountable to a monochrome image forming camera body.

9. An aberration correcting plate for an interchangeable lens detachably attachable to a first camera body having a large resultant thickness of filters provided in front of an image pickup device of the first camera body and to a second camera body having a small resultant thickness of filters provided in front of an image pickup device of the second camera body, said aberration correcting plate consisting of a single parallel-plate whose refractive index is greater than 1.7, said aberration correcting plate mounted to a rear portion of the interchangeable lens when said rear portion is mounted to the second camera body, and a sum of the thicknesses of the aberration correcting plate and the filters provided in front of the image pickup device of the second camera body is substantially identical to the total thickness of the filters provided in front of the image pickup device of the first camera body.

10. An aberration correcting plate according to claim 9, wherein an interchangeable lens for a color image forming camera body is mountable to a monochrome image forming camera body.

11. An aberration correcting plate according to claim 9, said aberration correcting plate having a uniform index of refraction.

12. An aberration correcting plate for an interchangeable lens detachably attachable to a first camera body having a large resultant thickness of filters provided in front of an image pickup device of the first camera body and to a second camera body having a small resultant thickness of filters provided in front of an image pickup device of the second camera body, said aberration correcting plate consisting of a single lens having a negative power, said aberration correcting plate mounted to a rear portion of the interchangeable lens when said rear portion is mounted to the second camera body, and a sum of the thicknesses of the aberration correcting plate and the filters provided in front of the image pickup device of the second camera body is less than the total thickness of the filters provided in front of the image pickup device of the first camera body.

* * * * *

UNITED STATES PATENT AND TRADEMARK OFFICE
CERTIFICATE OF CORRECTION

PATENT NO. : 5,602,682
DATED : February 11, 1997
INVENTOR(S) : T. ITO et al.

It is certified that error appears in the above-indentified patent and that said Letters Patent is hereby corrected as shown below:

On the cover, in section [22], the filing date, change "Jul. 26, 1994" to ---Jul. 25, 1994---.

Signed and Sealed this

Tenth Day of March, 1998

Attest:

BRUCE LEHMAN

Attesting Officer

Commissioner of Patents and Trademarks